United States Patent
Nomura et al.

(10) Patent No.: US 7,299,199 B2
(45) Date of Patent: Nov. 20, 2007

(54) INFORMATION-PROCESSING APPARATUS AND ASSOCIATED METHOD OF SECURELY PROVIDING CONTENTS FOR DISTRIBUTION

(75) Inventors: Hideki Nomura, Tokyo (JP); Akira Kurihara, Kanagawa (JP); Naomi Go, Kanagawa (JP)

(73) Assignee: Sony Corporation, Tokyo (JP)

( * ) Notice: Subject to any disclaimer, the term of this patent is extended or adjusted under 35 U.S.C. 154(b) by 149 days.

(21) Appl. No.: 10/415,811

(22) PCT Filed: Aug. 30, 2002

(86) PCT No.: PCT/JP02/08779

§ 371 (c)(1),
(2), (4) Date: Sep. 30, 2003

(87) PCT Pub. No.: WO03/027871

PCT Pub. Date: Apr. 3, 2003

(65) Prior Publication Data
US 2004/0054753 A1    Mar. 18, 2004

(30) Foreign Application Priority Data
Sep. 5, 2001    (JP)    ............................. 2001-268336

(51) Int. Cl.
*G06F 13/14*    (2006.01)
(52) U.S. Cl. ............................ 705/26; 705/1; 711/164; 709/203; 709/219
(58) Field of Classification Search ................ 709/203, 709/219, 201, 206, 213, 215, 217, 218, 229; 705/26, 27; 455/412.1, 414.2, 414.3; 711/161, 711/163, 164; 713/168, 164, 171
See application file for complete search history.

(56) References Cited

U.S. PATENT DOCUMENTS

| 6,134,593 | A | * | 10/2000 | Alexander et al. | ........... 709/229 |
| 2002/0042758 | A1 | * | 4/2002 | Deng | ........................... 705/26 |
| 2002/0123336 | A1 | * | 9/2002 | Kamada | ..................... 455/420 |

(Continued)

FOREIGN PATENT DOCUMENTS

EP    809221    A2 *    11/1997

(Continued)

*Primary Examiner*—B. James Peikari
(74) *Attorney, Agent, or Firm*—Oblon, Spivak, McClelland, Maier & Neustadt, P.C.

(57) ABSTRACT

The present invention relates to an information-processing system, an information-processing apparatus and an information-processing method. At a step S1, a PDA transmits a request for purchase of a content to a server. At steps S11, S12 and S14, the server receives the request for purchase of a content from the PDA and transmits the content to the PDA. At a step S5, the PDA transmits a request for preservation of the content to the server. At a step S16, the server generates a preservation ID based on a user ID for identifying the user of the PDA and based on a content ID for identifying the content, and issues the preservation ID to the PDA. At the next step S17, the server stores the issued preservation ID in a preservation-ID database by associating the preservation ID with the content ID. At a step S6, the PDA receives the issued preservation ID from the server and stores the preservation ID in a memory. The present invention can also be applied to an information management system.

10 Claims, 9 Drawing Sheets

U.S. PATENT DOCUMENTS

2003/0061115 A1* 3/2003 Wachi .......................... 705/26
2004/0193900 A1* 9/2004 Nair ........................... 713/193

FOREIGN PATENT DOCUMENTS

| JP | 10-124586 | 5/1998 |
| JP | 2001-142857 | 5/2001 |
| JP | 2001-209696 | 8/2001 |
| WO | WO 02/03199 A1 * | 1/2002 |

* cited by examiner

| CONTENT ID | CONTENT | ADDITIONAL INFORMATION |
|---|---|---|
| 0001 | CONTENT A | ADDITIONAL INFORMATION A |
| 0002 | CONTENT B | ADDITIONAL INFORMATION B |
| 0003 | CONTENT C | ADDITIONAL INFORMATION C |
| ⋮ | ⋮ | ⋮ |

FIG. 7

| PRESERVATION ID | CONTENT ID |
|---|---|
| 0001asfggg | 0001 |
| 0002ddsdcc | 0002 |
| 00034kg0fi | 0003 |
| 0001zzjk02 | 0001 |
| ⋮ | ⋮ |

FIG. 8

INFORMATION-PROCESSING APPARATUS AND ASSOCIATED METHOD OF SECURELY PROVIDING CONTENTS FOR DISTRIBUTION

BACKGROUND OF THE INVENTION

In general, the present invention relates to an information-processing system, an information-processing apparatus and an information-processing method. More particularly, the present invention relates to an information-processing system, an information-processing apparatus and an information-processing method that allow, for example, a content purchased by the user to be kept in a server.

In recent years, portable information terminal devices, such as a PDA (Personal Digital Assistant) and a digital portable telephone, have been utilized. Due to their small weight, it is convenient to connect the portable information terminals to the Internet for obtaining audio or video data content through a purchase arrangement or free download.

However, memory embedded in the portable information terminal device does not have sufficient storage capacity. Thus, when new content is purchased with limited available memory, that is, a state in which a number of contents has been already stored in the memory, the user must erase a content already stored in the memory or, as an alternative, the user must erase a content already stored in the memory after copying the content to another memory, typically a memory card if the user does not want to lose the content.

As described above, as the number of contents to be used increases, the user must prepare a memory card for extra capacity, or, in the case of only one memory card available, contents stored in the memory card must be further copied to a large-capacity hard disk of a personal computer. As a result, operations to be carried out by the user become complicated.

In addition, when the user wants to use a content, which was once copied to the hard disk of a personal computer, in the portable information terminal device, the content must be copied back from the hard disk to the portable information terminal device by way of the memory card or it is necessary to connect the portable information terminal device to the personal computer and copy the content from the personal computer to the portable information terminal. In this case, the operations to be carried out by the user also become complicated as well.

SUMMARY OF THE INVENTION

The present invention addresses the problems described above to provide an information-processing system that allows the user to purchase a content and preserve the purchased content in a server so that it is not necessary for the user to worry about the storage capacity of a portable information terminal device's memory for storing contents.

An information-processing system provided by the present invention is characterized in that: an information management apparatus includes: first content-recording means for recording a plurality of contents; transmission means for receiving a request for a transmission of a predetermined content from an information-processing apparatus, extracting the predetermined content from the contents recorded in the first recording means and transmitting the predetermined content to the information-processing apparatus; issuance means for generating a third ID based on a first ID for identifying the information-processing apparatus and based on a second ID for identifying the predetermined content and issuing the third ID to the information-processing apparatus; and second recording means for recording the third ID issued by the issuance means by associating the third ID with the second ID, and the information-processing apparatus including: first acquirement means for requesting the information management apparatus to transmit a predetermined content and acquiring the predetermined content transmitted by the information management apparatus as requested by the first acquirement means; second acquirement means for issuing a request to the information management apparatus to preserve the predetermined content acquired by the first acquirement means and acquiring a third ID transmitted by the information management apparatus in response to the request; and storage means for storing the third ID acquired by the second acquirement means.

In the information management apparatus of the information-processing system provided by the present invention, a request for a transmission of a predetermined content is received from the information-processing apparatus, the predetermined content is extracted from a plurality of recorded contents and the predetermined content is transmitted to the information-processing apparatus. In addition, a third ID is generated on the basis of a first ID for identifying the information-processing apparatus and on the basis of a second ID for identifying the predetermined content, and issued to the information-processing apparatus. The issued third ID is stored, being associated with the second ID. In the information-recording apparatus of the information-processing system provided by the present invention, on the other hand, a request is issued to the information management apparatus to transmit a predetermined content and the predetermined content transmitted by the information management apparatus on the basis of the request is acquired. Then, a request is issued to the information management apparatus to preserve the predetermined content and a third ID transmitted by the information management apparatus in response to the request is acquired and stored.

A first information-processing apparatus provided by the present invention is characterized in that the first information-processing apparatus includes: first recording means for recording a plurality of contents; transmission means for receiving a request for a transmission of a predetermined content from another information-processing apparatus, extracting the predetermined content from the contents recorded in the first recording means and transmitting the predetermined content to the other information-processing apparatus; issuance means for generating a third ID based on a first ID for identifying the other information-processing apparatus and based on a second ID for identifying the predetermined content and issuing the third ID to the other information-processing apparatus; and second recording means for recording the third ID issued by the issuance means by associating the third ID with the second ID.

When a request for a transmission of a predetermined content associated with a third ID is received from another information-processing apparatus, the transmission means reads out a second ID associated with the third ID from the second recording means, reads out the predetermined content identified by the second ID from the first recording means and transmits the predetermined content to the other information-processing apparatus.

The issuance means is capable of issuing a third ID to another information-processing apparatus when a request to preserve a predetermined content is received from the other information-processing apparatus.

A first information-processing method provided by the present invention is characterized in that the first information-processing method includes: a first recording control processing step of controlling an operation to record a plurality of contents; a transmission processing step of receiving a request for a transmission of a predetermined content from another information-processing apparatus, extracting the predetermined content from the contents recorded in a process carried out at the first recording control processing step and transmitting the predetermined content to the other information-processing apparatus; an issuance processing step of generating a third ID based on a first ID for identifying the other information-processing apparatus and based on a second ID for identifying the predetermined content and issuing the third ID to the other information-processing apparatus; and a second recording control processing step of controlling an operation to record the third ID, which has been issued in a process carried out at the issuance processing step, by associating the third ID with the second ID.

A first recording medium provided by the present invention to be used for recording a program is characterized in that the program includes: a first recording control processing step of controlling an operation to record a plurality of contents; a transmission processing step of receiving a request for a transmission of a predetermined content from another information-processing apparatus, extracting the predetermined content from the contents recorded in a process carried out at the first recording control processing step and transmitting the predetermined content to the other information-processing apparatus; an issuance processing step of generating a third ID based on a first ID for identifying the other information-processing apparatus and based on a second ID for identifying the predetermined content and issuing the third ID to the other information-processing apparatus; and a second recording control processing step of controlling an operation to record the third ID, which has been issued in a process carried out at the issuance processing step, by associating the third ID with the second ID.

A first program provided by the present invention is characterized in that the first program is to be executed by a computer to carry out: a first recording control processing step of controlling an operation to record a plurality of contents; a transmission processing step of receiving a request for a transmission of a predetermined content from another information-processing apparatus, extracting the predetermined content from the contents recorded in a process carried out at the first recording control processing step and transmitting the predetermined content to the other information-processing apparatus; an issuance processing step of generating a third ID based on a first ID for identifying the other information-processing apparatus and based on a second ID for identifying the predetermined content and issuing the third ID to the other information-processing apparatus; and a second recording control processing step of controlling an operation to record the third ID, which has been issued in a process carried out at the issuance processing step, by associating the third ID with the second ID.

In accordance with the first information-processing apparatus, the first information-processing method and the first program, which are provided by the present invention, a request for a transmission of a predetermined content is received from another information-processing apparatus and the predetermined content is extracted from a plurality of already recorded contents to be transmitted to the other information-processing apparatus; a third ID is generated on the basis of a first ID for identifying the other information-processing apparatus and a second ID for identifying the predetermined content and issued to the other information-processing apparatus; and the third ID is recorded by associating the third ID with the second ID.

A second information-processing apparatus provided by the present invention is characterized in that the second information-processing apparatus includes: first acquirement means for requesting another information-processing apparatus to transmit a content and acquiring the content transmitted by the other information-processing apparatus as requested by the first acquirement means; second acquirement means for issuing a request to the other information-processing apparatus to preserve the content acquired by the first acquirement means and acquiring an ID, which identifies the content and is transmitted by the other information-processing apparatus in response to the request; and storage means for storing the ID acquired by the second acquirement means.

The second information-processing apparatus may include third acquirement means for requesting another information-processing apparatus to transmit a content identified by an ID stored in the storage means and acquiring the content transmitted by the other information-processing apparatus as requested by the third acquirement means.

A second information-processing method provided by the present invention is characterized in that the second information-processing method includes: a first acquirement control processing step of requesting another information-processing apparatus to transmit a content and controlling an operation to acquire the content transmitted by the other information-processing apparatus as requested; a second acquirement control processing step of issuing a request to the other information-processing apparatus to preserve the content acquired in a process carried out at the first acquirement control processing step and controlling an operation to acquire an ID, which identifies the content and is transmitted by the other information-processing apparatus in response to the request; and a storage control processing step of controlling an operation to store the ID acquired in a process carried out at the second acquirement control processing step.

A second recording medium provided by the present invention to be used for recording a program is characterized in that the program includes: a first acquirement control processing step of requesting another information-processing apparatus to transmit a content and controlling an operation to acquire the content transmitted by the other information-processing apparatus as requested; a second acquirement control processing step of issuing a request to the other information-processing apparatus to preserve the content acquired in a process carried out at the first acquirement control processing step and controlling an operation to acquire an ID, which identifies the content and is transmitted by the other information-processing apparatus in response to the request; and a storage control processing step of controlling an operation to store the ID acquired in a process carried out at the second acquirement control processing step.

A second program provided by the present invention is characterized in that the second program is to be executed by a computer to carry out: a first acquirement control processing step of requesting another information-processing apparatus to transmit a content and controlling an operation to acquire the content transmitted by the other information-processing apparatus as requested; a second acquirement control processing step of issuing a request to the other information-processing apparatus to preserve the content acquired in a process carried out at the first acquirement control processing step and controlling an operation to acquire an ID, which identifies the content and is transmitted by the other information-processing apparatus in response to the request; and a storage control processing step of controlling an operation to store the ID acquired in a process carried out at the second acquirement control processing step.

In accordance with the second information-processing apparatus, the second information-processing method and the second program, which are provided by the present invention, another information-processing apparatus is requested to transmit a content and the content transmitted by the other information-processing apparatus as requested is acquired; a request is issued to the other information-processing apparatus to preserve the content and an ID, which identifies the content and is transmitted by the other information-processing apparatus in response to the request, is acquired; and a storage control processing step of controlling an operation to store the ID acquired in a process carried out at the second acquirement control processing step.

DETAILED DESCRIPTION OF THE INVENTION

An embodiment of the present invention is explained by referring to the diagrams as follows.

Figure 1:
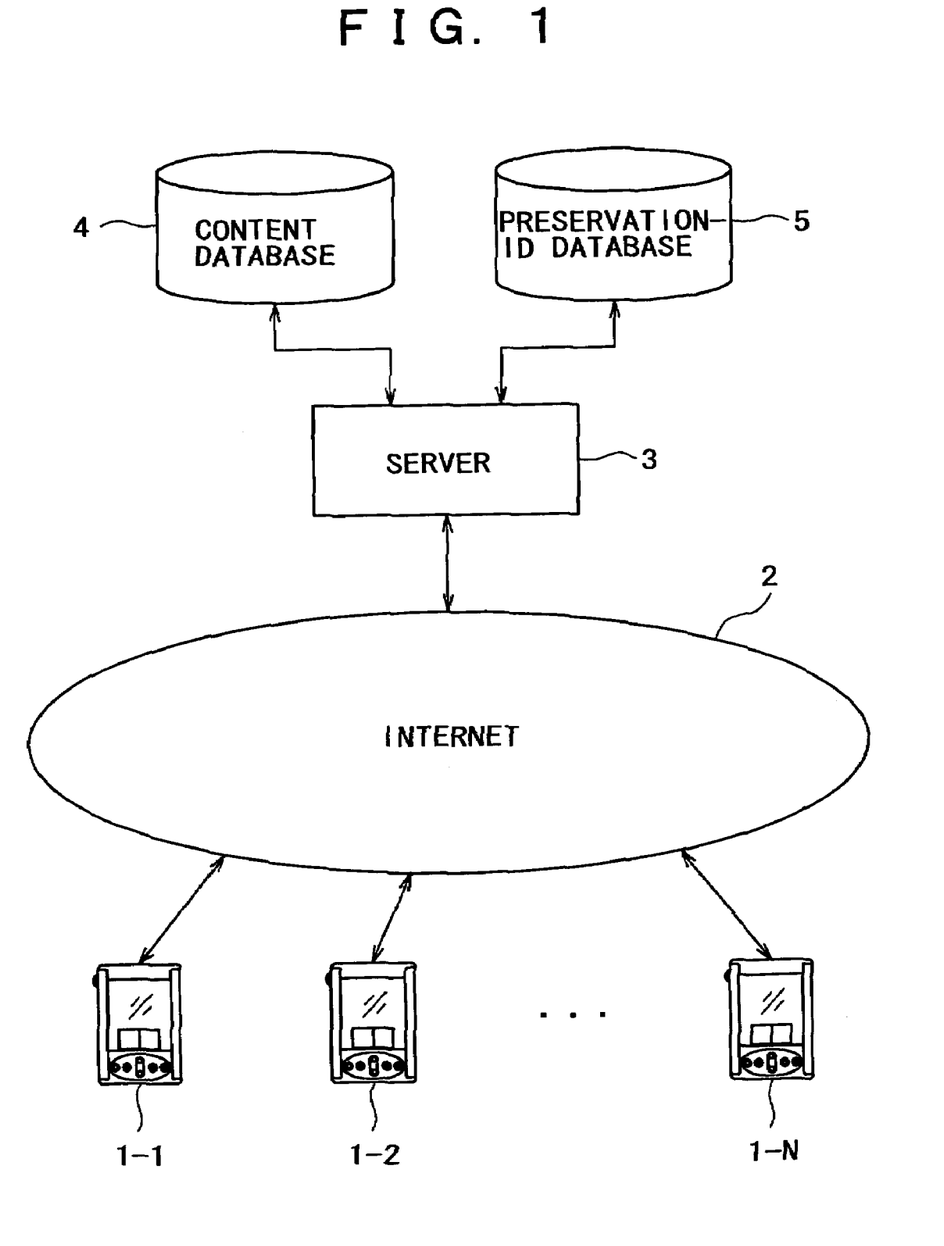
FIG. 1 is a block diagram showing a typical configuration of a content-providing system to which the present invention is applied.

FIG. 1 is a block diagram showing a typical configuration of a content-providing system to which the present invention is applied. In the content-providing system, PDAs 1-1 to 1-N and a server 3 are connected to the Internet 2. In the following description, the PDAs 1-1 to 1-N are each referred to as a PDA 1, which is a generic reference numeral for the PDAs, if it is not necessary to distinguish the PDAs 1-1 to 1-N from each other.

The user operates any of the PDAs 1-1 to 1-N to transmit a request for purchase of a content to the server 3 through the Internet 2. At that time, the ID of the user is also transmitted to the server 3 as well.

Figure 3:
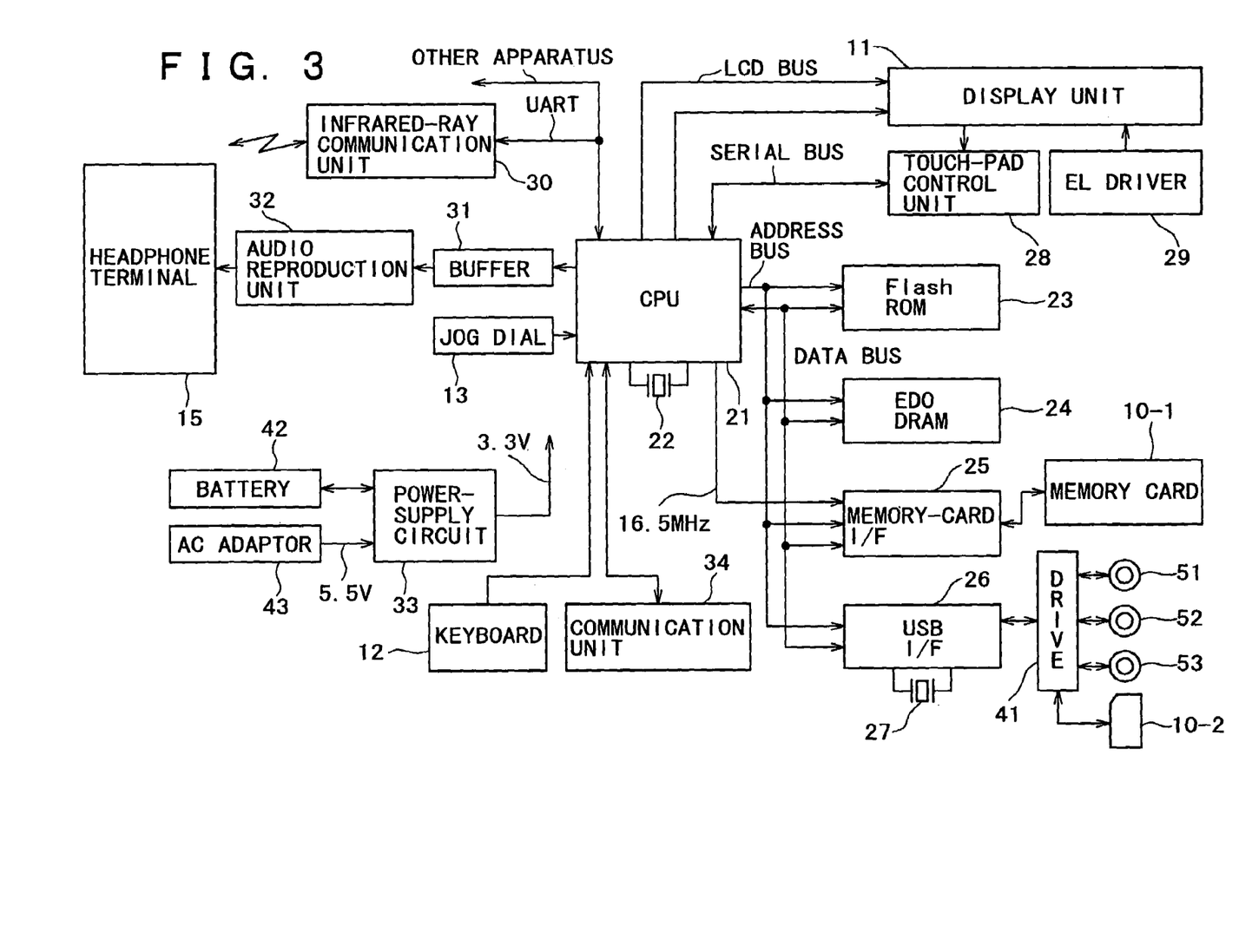
FIG. 3 is a block diagram showing a typical electrical configuration of the PDA.

It is to be noted that the server 3 has received information on the user and issued the user ID to the user to indicate acceptance of the user in advance. The information includes the user's address, name and phone number. The user ID issued by the server is stored typically in a flash ROM 23 employed in the PDA 1 as shown in FIG. 3.

Subsequently, a particular one of the PDAs 1-1 to 1-N, which was operated by the user, receives the content transmitted by the server 3 on the basis of the purchase request, and stores the content in a memory card 10 shown in FIG. 2. Then, the user operates the particular one of the PDAs 1-1 to 1-N to transmit a request to the server 3, asking the server 3 that the purchased content be preserved, and to acquire a preservation ID issued by the server 3 in response to the request, storing the preservation ID in the memory card 10.

The user may also operate any of the PDAs 1-1 to 1-N to read out a preservation ID from the memory card 10 and transmit the preservation ID to the server 3 as a request for a transmission of a content associated with the preservation ID.

The server 3 is connected to a content database 4 and a preservation-ID database 5. The content database 4 is used for storing data of contents and additional information associated with the contents. On the other hand, the preservation-ID database 5 is used for storing preservation IDs, which are issued to users when the users request the server 3 that purchased contents be preserved. It is to be noted that the content database 4 and the preservation-ID database 5 can be integrated into a single database if necessary.

When the server 3 receives a request for purchase of a content, which is a request transmitted by any of the PDAs 1-1 to 1-N through the Internet 2, the server 3 reads out the content from the content database 4 and transmits the content to the PDA 1 making the request. In addition, when the server 3 receives a request for preservation of a purchased content, which is a request transmitted by any of the PDAs 1-1 to 1-N through the Internet 2, the server 3 issues a preservation ID based on the content ID of the purchased content transmitted to the user earlier and based on the user ID of the user making the request for preservation of the purchased content, and transmits the preservation ID to one of the PDAs 1-1 to 1-N, which has made the request for preservation of the purchased content. The server 3 then stores the issued preservation ID in the preservation-ID database 5 by associating the preservation ID with the content ID.

It is to be noted that, while only one server 3 is connected to the Internet 2 as shown in FIG. 1, in actuality, a plurality of servers 3 can be connected to the Internet 2.

Figure 2:
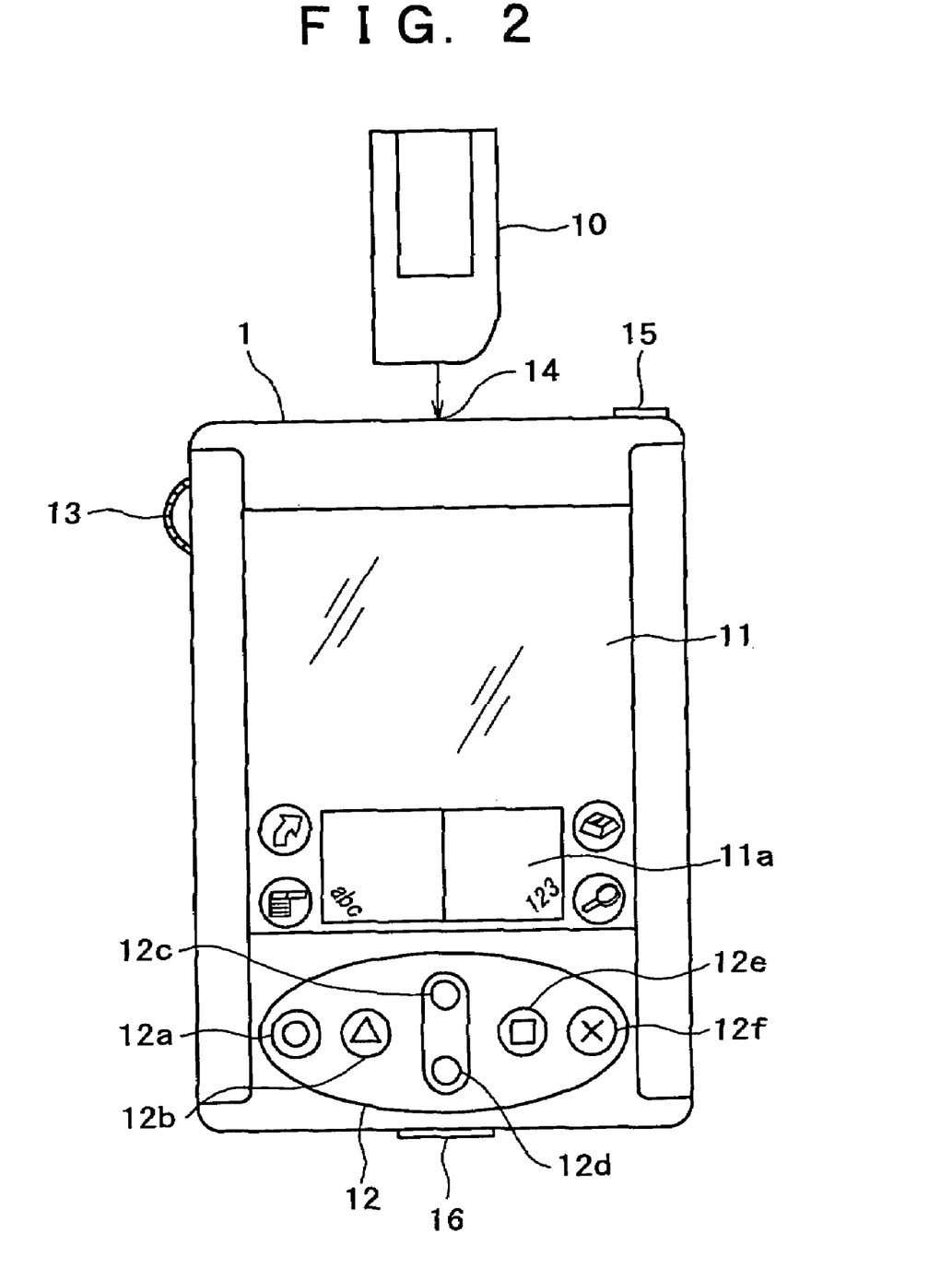
FIG. 2 is a diagram showing a typical configuration of the external view of a PDA in the content-providing system shown in FIG. 1.

FIG. 2 is a diagram showing a typical configuration of the external view of a PDA 1 in the content-providing system shown in FIG. 1.

The PDA 1 is enclosed in a case having such a size that the PDA 1 can be held in one hand and operated by one hand. On the upper portion of the PDA 1, there are provided a memory-card slot 14, into which a memory card 10 is to be inserted, and an infrared-ray communication unit 30 shown in FIG. 3. The infrared-ray communication unit 30 is a component for exchanging information with other apparatus by carrying out infrared-ray communications. On the upper portion of the PDA 1, it is also possible to provide a radio LAN unit (not shown) for carrying out Bluetooth (trademark) radio communications The memory card 10 shown in FIG. 2 is typically a flash memory card developed by the applicant for a patent of the present invention. The flash memory card 10 developed by the applicant for a patent of the present invention is called a memory stick (trademark). This memory stick accommodates a flash-memory device in a small and thin plastic case having a height of 50 mm, a width of 21.5 mm and a thickness of 2.8 mm. The flash-memory device is a kind of EEPROM (Electrically Erasable Programmable Read-Only Memory), which is a non-volatile memory allowing data stored therein to be electrically overwritten and erased. The plastic case has 10 pins through which various kinds of data are written into and read out from the flash-memory device. Examples of the data are picture, sound and musical data.

In addition, the memory stick adopts an original serial protocol capable of sustaining compatibility with an apparatus employing the memory stick even if the specifications of the flash memory embedded in the memory stick are changed due to, for example, enhancement of the storage capacity. The memory stick realizes high-speed performance including a maximum write speed of 1.5 MB/S and a maximum read speed of 2.45 MB/S. In addition, the memory stick is provided with an inadvertent-erasure prevention switch for preventing data stored therein from being mistakenly erased so as to preserve high reliability.

Refer back to FIG. 2. On the bottom surface of the PDA 1, there are provided a modem not shown in the figure and a USB (Universal Serial Bus) port 16 or an RS-232C port also not shown in the figure. The modem connects the PDA 1 to a public line network. The USB port 16 or the RS-232C port is used for exchanging various kinds of data with an external apparatus. In addition, the PDA 1 has a display unit 11, a keyboard 12, a jog dial 13 and a headphone terminal 15.

The display unit 11 is a thin display device such as a liquid-crystal display device for displaying pictures such as an icon and a thumbnail or a text. On the lower side of the display unit 11, a touch pad 11a is provided. The user presses the display unit 11 or the touch pad 11a by using a finger or a pen in order to enter predetermined data or an operation command to a CPU (Central Processing Unit) 21, which is employed in the PDA 1 as shown in FIG. 3.

The keyboard 12 includes keys 12a to 12f. The user operates the keys 12a to 12f in order to enter predetermined data or an operation command to the CPU 21. When the user operates the keyboard 12, the CPU 21 activates software for displaying a schedule, a list of addresses or a memo, or scrolls the display screen.

For example, with a comic-picture screen, which will be described later, appearing on the display unit 11, when the key 12a or 12b is operated, the screen is scrolled in the left direction of the screen, when the key 12e or 12f is operated, the screen is scrolled in the left direction of the screen, when the key 12c is operated, the screen is scrolled in the upward direction of the screen and when the key 12d is operated, the screen is scrolled in the downward direction of the screen.

The user rotates or presses the jog dial 13 against the body of the PDA 1 in order to select one of items such as an icon, a thumbnail and a text, which are appearing on the display unit 11. If the user rotates the jog dial 13 with a plurality of icons appearing on the display unit 11, for example, a desired icon can be selected among the displayed icons. If the user further presses the jog dial 13 against the body of the PDA 1, the selection of the selected icon is confirmed. If the selected icon corresponds to an application program, the application program is activated when the selection of the selected icon is confirmed.

In addition, the PDA 1 can be designed so that an operation to rotate the jog dial 13 while pressing the jog dial 13 is interpreted as an instruction different from the ordinary rotating operation. Nevertheless, relations between operations of the jog dial 13 and instructions corresponding to the operations are not limited to what is described above.

The headphone terminal 15 outputs sounds received from a sound generation unit 32 employed in the PDA 1 as shown in FIG. 3 to a headphone shown in none of the figures.

FIG. 3 is a block diagram showing a typical electrical configuration of the PDA 1.

In synchronization with a clock signal generated by an oscillator 22, the CPU 21 executes a variety of programs stored in a flash ROM (Read-Only Memory) 23 or an EDO DRAM (Extended Data Out Dynamic Random-Access Memory) 24. The programs include an operating system and application programs.

The flash ROM 23 is a flash memory, which is a kind of EEPROM. In general, the flash ROM 23 is used for storing programs to be executed by the CPU 21 and basically fixed data to be used as processing parameters. A user ID is also stored in the flash ROM 23. On the other hand, the EDO DRAM 24 is used for storing programs to be executed by the CPU 21 and parameters that vary during the execution of a program.

A memory-card interface (I/F) 25 reads out a content or data from a memory card 10-1 inserted into the memory-card slot 14 of the PDA 1 and writes a content or data received from the CPU 21 into the memory card 10-1.

In synchronization with a clock signal received from an oscillator 27, a USB interface 26 inputs data or a program from a drive 41 and outputs data received from the CPU 21 to the drive 41. The drive 41 is a USB apparatus connected to the PDA 1 through the USB port 16.

A magnetic disk 51, an optical disk 52, a magneto-optical disk 53 or a memory card 10-2 is mounted on the drive 41 as required. The drive 41 reads out data or a program from the magnetic disk 51, the optical disk 52, the magneto-optical disk 53 or the memory card 10-2 and supplies the data or the program to the CPU 21 or the EDO DRAM 24 by way of the USB port 26. In addition, the drive 41 records data or a program into the magnetic disk 51, the optical disk 52, the magneto-optical disk 53 or the memory card 10-2.

The flash ROM 23, the EDO DRAM 24, the memory-card interface 25 and the USB interface 26 are connected to the CPU 21 by address and data buses.

The display unit 11 receives data transmitted by the CPU 21 to the display unit 11 by way of an LCD bus. The display unit 21 displays a picture or characters in accordance with the received data. When the user carries out an operation on the display unit 11 or the touch pad 11a, a touch-pad control unit 28 receives data according to the operation from the display unit 11 or the touch pad 11a, and supplies a signal representing the received data to the CPU 21 by way of a serial bus. An example of the data is the coordinates of a location touched by the user.

An EL (Electro Luminescence) driver 29 drives an electric-field-emitting device provided on the back side of a liquid-crystal display device, which is employed in the display unit 11, in order to control the brightness of the display unit 11.

An infrared-ray communication unit 30 transmits an infrared-ray signal representing data received from the CPU 21 through a UART (Universal Asynchronous Receiver-Transmitter) to other apparatus not shown in the figure. On the other hand, the infrared-ray communication unit 30 receives an infrared-ray signal from another apparatus and supplies the infrared-ray signal to the CPU 21. In addition, the PDA 1 is also capable of communicating with another apparatus through a UART.

An audio reproduction unit 32 includes a circuit for decoding audio data. To be more specific, the audio reproduction unit 32 decodes audio data stored in advance or received from another apparatus and outputs a sound obtained as a result of decoding by way of the headphone terminal 15. For example, the audio reproduction unit 32 decodes audio data received from the CPU 21 through a buffer 31 and outputs a sound obtained as a result of decoding to a headphone not shown in the figure by way of the headphone terminal 15.

A power-supply circuit 33 transforms the voltage of a power received from a battery 42 mounted in the PDA 1 or from an AC (Alternating Current) adaptor 43 into proper voltages of powers required by components ranging from the CPU 21 to the audio reproduction unit 32, and supplies the required powers to the components.

A communication unit 34 is an interface such as an RS-232C interface connected to a communication module or the like. Connected to the Internet 2 by the communication module, the communication unit 34 transmits data such as an electronic mail received from the CPU 21 to another apparatus by way of the Internet 2 by accommodating the data in a packet conforming to a predetermined communication technique. In addition, the communication unit 34 supplies contents of a packet received from another apparatus through the Internet 2 to the CPU 21. Typical contents of a received packet are data or a program.

The memory card 10-1 or 10-2 is used for storing a purchased content received from the server 3. However, a purchased content received from the server 3 can also be stored in the flash ROM 23.

In the following description, the memory card 10-1 or 10-2 is denoted by generic reference numeral 10 in case it is not necessary to distinguish the memory cards 10-1 and 10-2 from each other.

Figure 4:
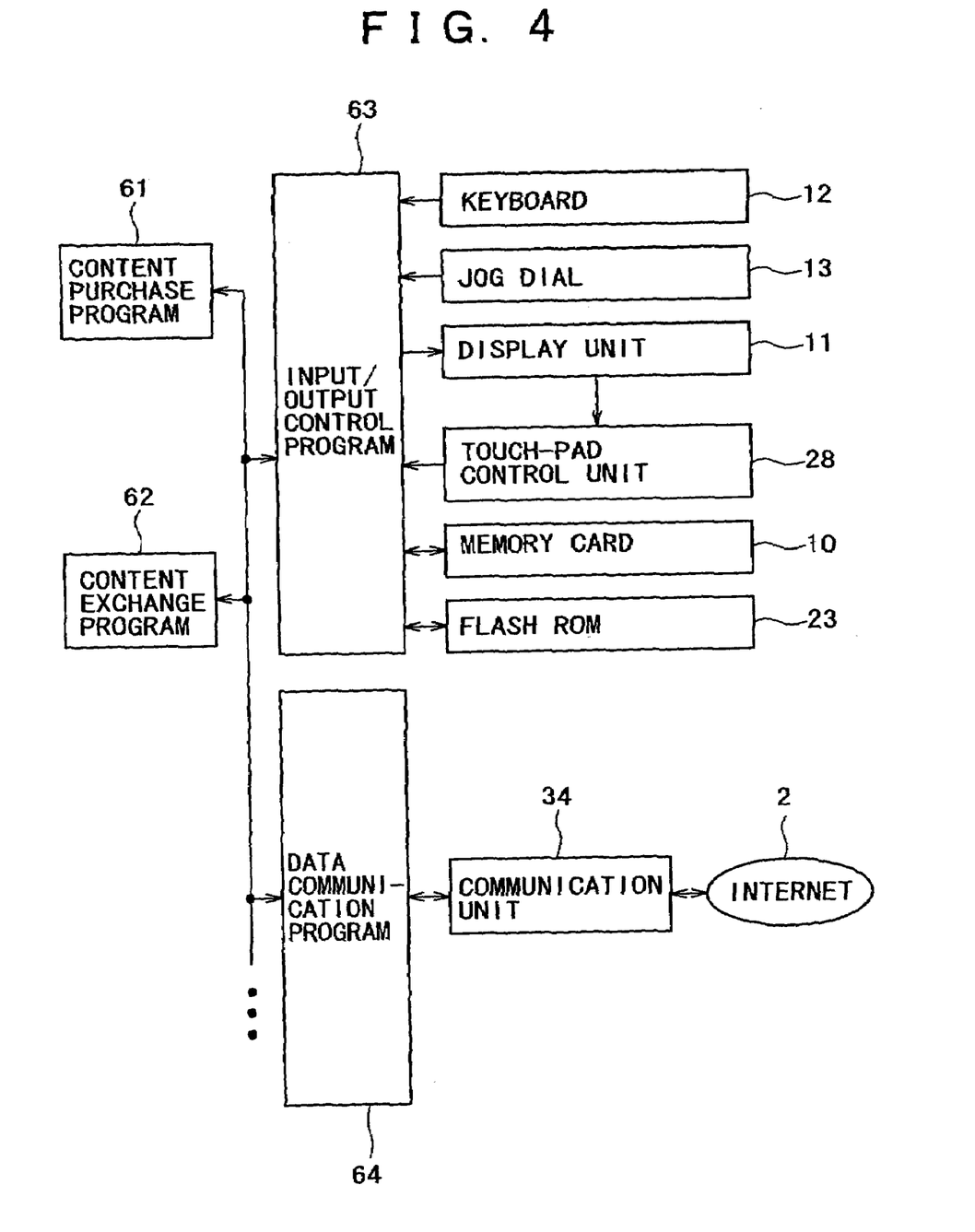
FIG. 4 is an explanatory functional block diagram showing functions of the PDA.

FIG. 4 is an explanatory functional block diagram showing functions of the PDA 1.

A content purchase program 61 is a program for transmitting a request for purchase of a content to the server 3 and downloading (that is, purchasing) the content from the server 3. In addition, the content purchase program 61 is also a program for transmitting a request for preservation of a purchased content to the server 3 and acquiring a preservation ID issued by the server 3. Furthermore, the content purchase program 61 is also a program for storing data such as a purchased (or downloaded) content and a preservation ID into the memory card 10 or the flash ROM 23.

A content exchange program 62 is a program for making a request for a transmission of a content from the server 3 by transmitting a preservation ID identifying the requested content from the memory card 10 or the flash ROM 23 to the server 3, and for downloading the requested content from the server 3.

An input/output control program 63 is a program for supplying a signal representing an operation carried out by the user on the keyboard 12 or the jog dial 13 or representing a command entered by the user to the content purchase program 61 or the content exchange program 62, for displaying a predetermined picture on the display unit 11 in accordance with a result of a process carried out by execution of the content purchase program 61 or the content exchange program 62, for supplying data such as a purchased content and a preservation ID to the memory card 10 or the flash ROM 23 to be stored therein and for controlling processes including an operation to read out a user ID from the flash ROM 23.

A data communication program 64 is a program for controlling communications for exchanging information between the communication unit 34 and the server 3 through the Internet 2 as a result of execution of the content purchase program 61 or the content exchange program 62 by the CPU 21.

Figure 5:
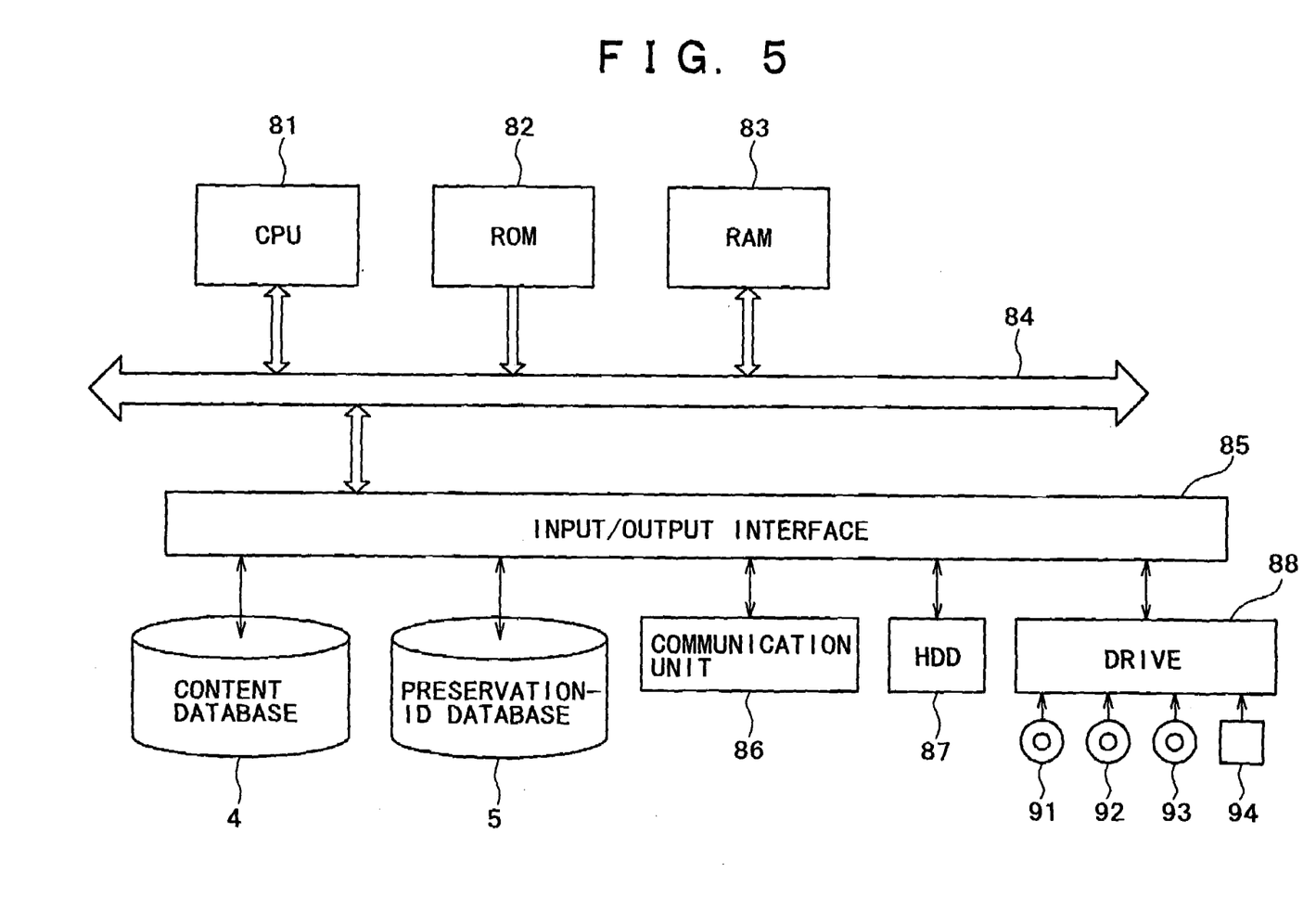
FIG. 5 is a block diagram showing a typical configuration of a server in the content-providing system shown in FIG. 1.

FIG. 5 is a block diagram showing a typical configuration of the server 3.

A CPU 81 carries out various kinds of processing by execution of programs stored in a ROM 82 and programs loaded from a hard disk drive 87 to a RAM 83. The RAM 83 is also used for properly storing information including data required by the CPU 81 in execution of the processing.

The CPU 81, the ROM 82 and the RAM 83 are connected to each other by a bus 84, which is also connected to an input/output interface 85.

The input/output interface 85 is connected to a communication unit 86, a hard disk drive (HDD) 87 and databases such as the content database 4 and the preservation-ID database 5. The communication unit 86 is typically a modem or a terminal adaptor for carrying out communication processing through a network such as the Internet 2.

The input/output interface 85 is connected to a drive 88 as necessary. On the drive 88, an appropriate recording medium such as a magnetic disk 91, an optical disk 92, a magneto-optical disk 93 or a semiconductor memory 94 is mounted. A required computer program is read out from the recording medium and installed in the hard disk drive 87.

Figure 6:
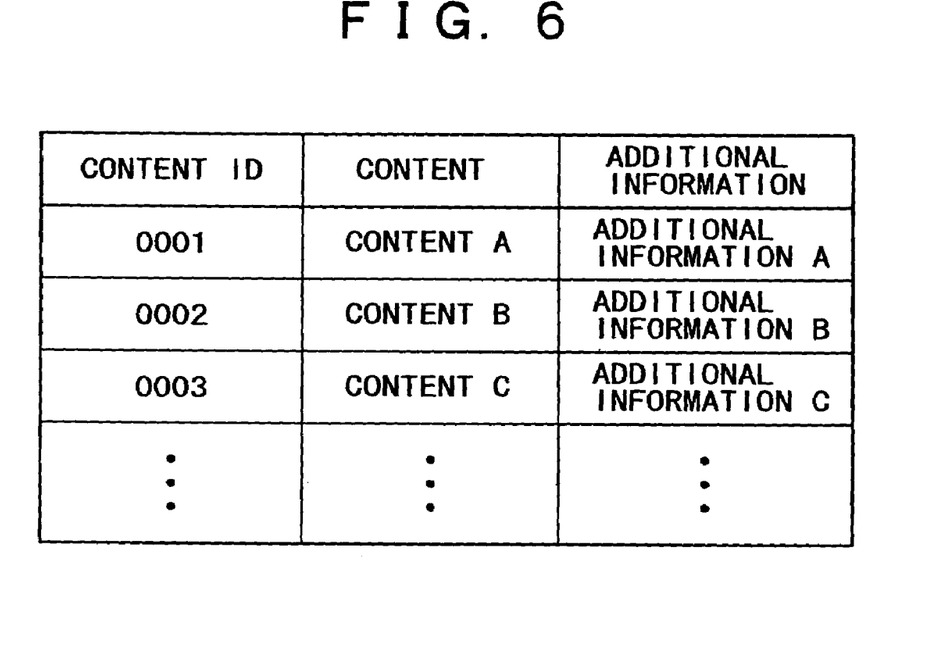
FIG. 6 is a diagram showing typical information stored in a content database.

FIG. 6 is a diagram showing typical information stored in the content database 4.

As shown in the figure, the content database 4 is used for storing contents, which are main data, and pieces of additional information each associated with one of the contents. Each of the contents and each of the pieces of additional information are associated with a content ID. A content ID is unique to a content. That is to say, a content ID is an identifier having a value peculiar to a content. If the content is musical data, its additional information includes the name of the recording company, the genre of the music, the name of the libretto composer, the name of the song writer, the name of the singer and the sales date of the content. If the content is picture data, on the other hand, its additional information includes the name of a company producing the picture, the name of the picture creator and the date of the picture creation. It is needless to say that the additional information is not limited to these examples.

In the typical content database shown in FIG. 6, content A and additional information A are recorded, being associated with a content ID of 0001. By the same token, content B and additional information B are recorded, being associated with a content ID of 0002. In the same way, content C and additional information C are recorded, being associated with a content ID of 0003.

Figure 7:
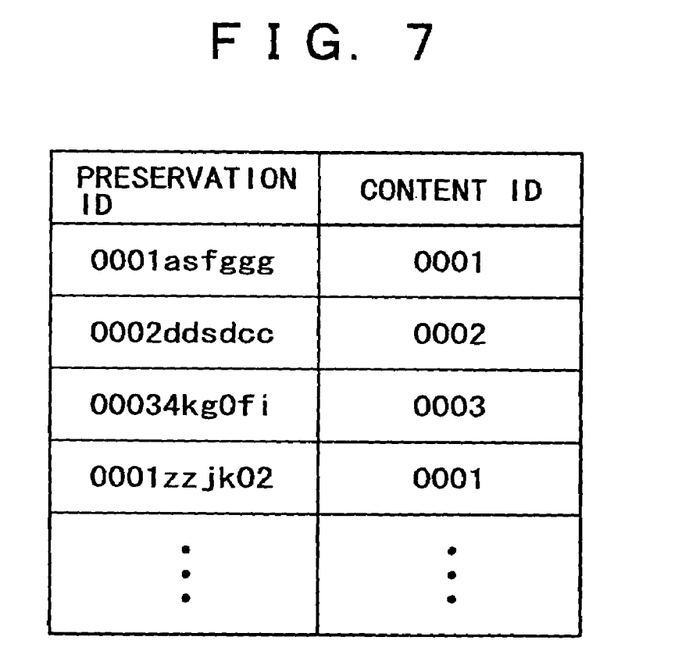
FIG. 7 is a diagram showing typical information stored in a preservation-ID database.

FIG. 7 is a diagram showing typical information stored in the preservation-ID database 5.

As shown in the figure, the preservation-ID database 5 is used for storing information such as content IDs by associating each of the content IDs with a preservation ID. A preservation ID is issued on the basis of a content ID and a user ID. That is to say, a preservation ID is an identifier having a value unique to a user and a content.

In the typical preservation-ID database shown in FIG. 7, a content ID of 0001 is recorded, being associated with a preservation ID of 0001asfggg. By the same token, a content ID of 0002 is recorded, being associated with a preservation ID of 0002ddsdcc. In the same way, a content ID of 0003 is recorded, being associated with a preservation ID of 00034 kg0fi. Similarly, a content ID of 0001 is recorded, being associated with a preservation ID of 0001zzjk02.

The preservation IDs shown in FIG. 7 are each created by appending a user ID to a content ID. For example, a user ID of asfggg is appended to a content ID of 0001 and a user ID of ddsdcc is appended to a content ID of 0002. It is to be noted, however, that the creation of the preservation IDs is no more than a typical way of creating preservation IDs in order to make the description easy to understand.

Figure 8:
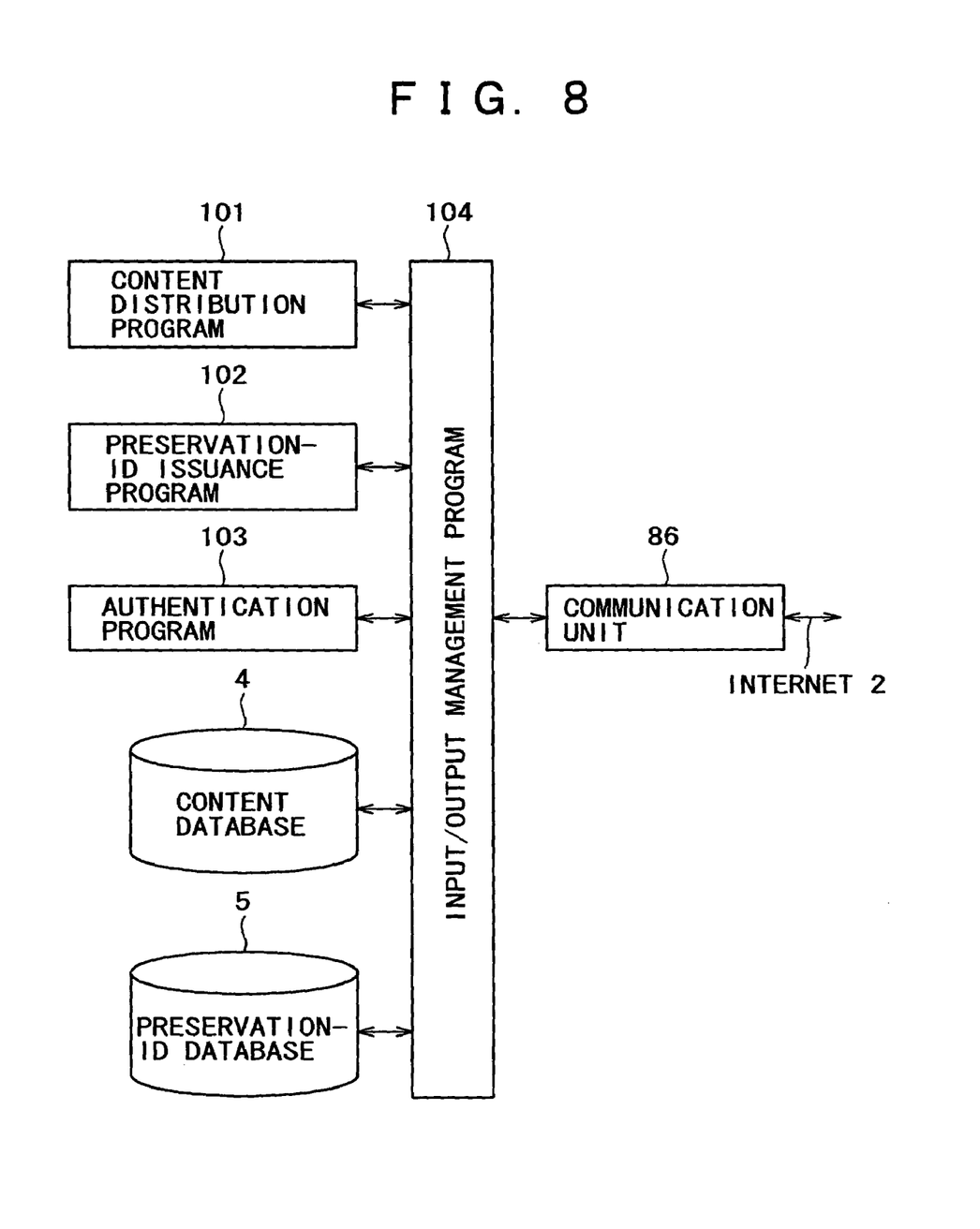
FIG. 8 is an explanatory functional block diagram showing functions of the server.

FIG. 8 is an explanatory functional block diagram showing functions of the server 3.

A content distribution program 101 is a program for reading out a content from the content database 4 and transmitting the content to a PDA 1 in response to a request for purchase of the content, which is a request made by the PDA 1. The content distribution program 101 is also a program for reading out a content ID associated with a preservation ID specified in a request for a transmission of a content from the preservation-ID database 5 and for further reading out the content identified by the content ID from the content database 4 and, finally, transmitting the content to a PDA 1 in response to the request made by the PDA 1.

A preservation-ID issuance program 102 is a program for issuing a preservation ID based on a user ID and based on a content ID in response to a request for a preservation of a content identified by the content ID, which is a request received from a PDA 1 associated with the user ID. The preservation-ID issuance program 102 is also a program for storing an issued preservation ID in the preservation-ID database 5, associating the preservation ID with the content ID.

An authentication program 103 is a program, which is used for authenticating the user on the basis of a user ID owned by a PDA 1 when a request for purchase of a content is received from the PDA 1. The authentication program 103 is also a program, which is used for carrying out an authentication process to verify the validity of a preservation ID specified in a request for a preservation of a content when the request is received from a PDA 1.

An input/output management program 104 is a program for supplying a signal received from a PDA 1 through the communication unit 86 to the content distribution program 101, the preservation-ID issuance program 102 or the authentication program 103 and for managing processes to transmit predetermined data based on results of processing carried out by the content distribution program 101, the preservation-ID issuance program 102 and the authentication program 103 to a PDA 1 by way of the communication unit 86 and the Internet 2.

Figure 9:
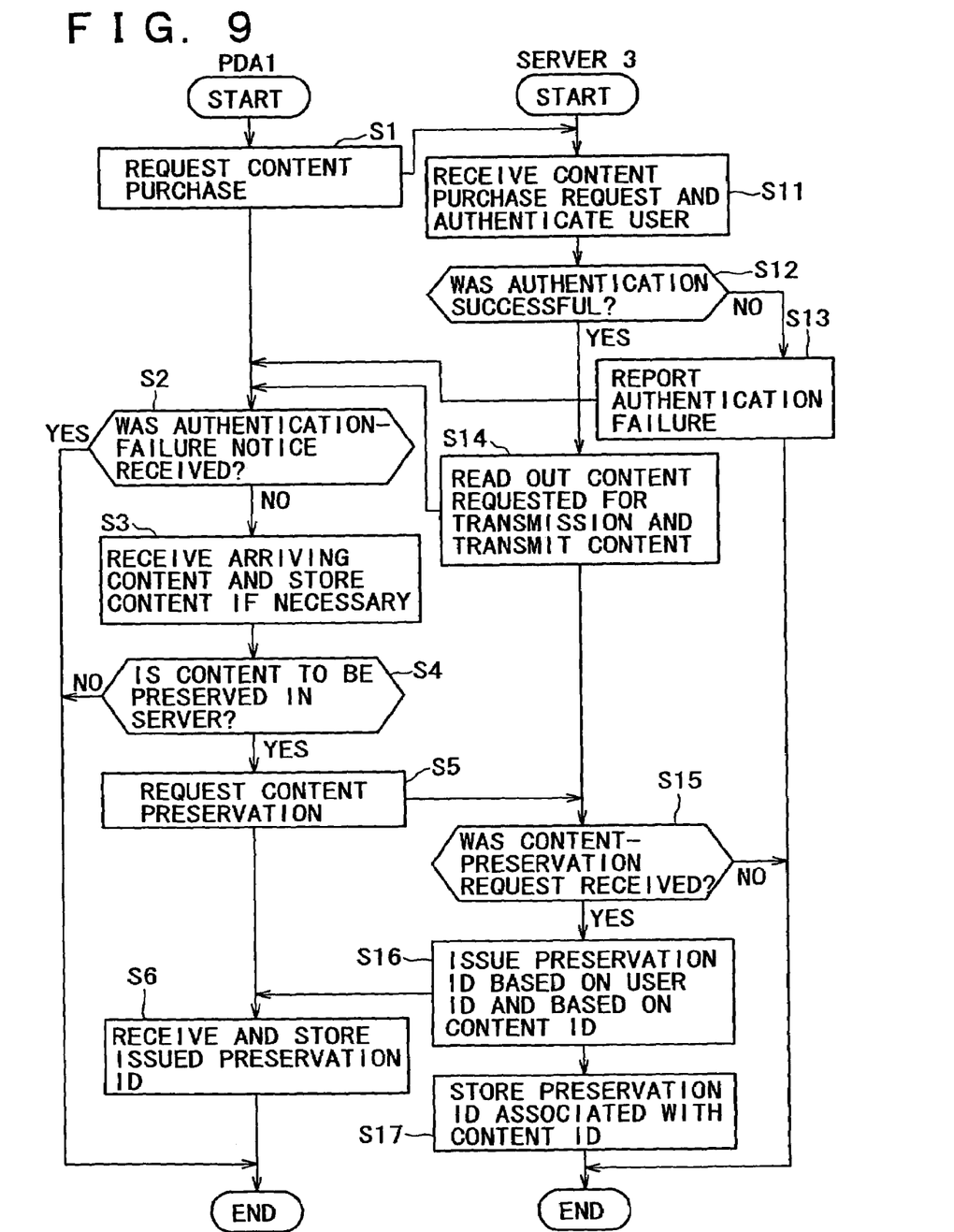
FIG. 9 shows a flowchart representing processing ranging from an operation to purchase a content to an operation to preserve the content; and, FIG. 10 shows a flowchart representing processing to download a purchased content preserved in the server.

By referring to a flowchart shown in FIG. 9, the following description explains pieces of processing ranging from an operation carried out by a PDA 1 to purchase a content to an operation to preserve the content in the server 3.

First of all, when the user of a PDA 1 wants to purchase a content, the user activates the content purchase program 61 by operating the keyboard 12, the jog dial 13 or the touch pad 11a of the display unit 11. In this way, the CPU 21 of the PDA 1 executes the content purchase program 61 stored in flash ROM 23 or the EDO DRAM 24. While the content purchase program 61 is being executed, the user enters information on the content to be purchased. Examples of the information on the content to be purchased are the name of the content and the content ID of the content.

At a step S1, by execution of the content purchase program 61, the PDA 1 receives information on a desired content. Entered by the user, examples of the information on the content to be purchased are the name of the content and the content ID of the content as described above. Under control of the data communication program 64, the communication unit 34 transmits a signal making a request for purchase of the content to the server 3 by way of the Internet 2. At that time, a user ID stored in the flash ROM 23 is also transmitted to the server 3 as well.

At a step S1, in the server 3, the communication unit 86 receives the request for purchase of the content from the PDA 1 through the Internet 2, and passes on the request to the CPU 81 under control of the input/output management program 104. The CPU 81 then executes the content distribution program 101 to handle the request for purchase of the content.

The authentication program 103 is then executed to authenticate the user on the basis of a user ID included in the request for purchase of the content. A result of the authentication is then supplied to the content distribution program 101.

At the next step S12, by execution of the content distribution program 101, the CPU 81 forms a judgment as to whether or not the authentication of the user was successful on the basis of the authentication result received from the authentication program 103. If the authentication of the user was unsuccessful due to, for example, the fact that the user has been determined to be an unregistered user, the flow of the processing goes on to a step S13 at which the communication unit 86 transmits a message indicating the unsuccessful authentication of the user to the PDA 1 by way of the Internet 2 under control of the input/output management program 104. The processing is then ended.

If the result of the judgment formed at the step S12 indicates a successful authentication of the user, on the other hand, the flow of the processing goes on to a step S14 at which, by execution of the content distribution program 101, the CPU 81 reads out a content indicated by a content name or a content ID from the content database 4 shown in FIG. 6, and the communication unit 86 then transmits the content to the PDA 1 by way of the Internet 2 under control of the input/output management program 104. The content name or the content ID is information included in the request for purchase of the content.

At a step S2, by execution of the content purchase program 61, the PDA 1 forms a judgment as to whether or not a message received from the server 3 indicates an unsuccessful authentication of the user. If the result of the judgment shows that the message received from the server 3 indicates an unsuccessful authentication of the user, the processing is ended without executing subsequent steps. Then, if necessary, the user registers itself in the server 3 before again starting the process of the step S1.

If the result of the judgment formed at the step S2 shows that no message was received from the server 3 to indicate an unsuccessful authentication of the user, on the other hand, the flow of the processing goes on to a step S3 at which the communication unit 34 receives the content from the server 3 through the Internet 2, and passes on the content to the content purchase program 61 under control of the data communication program 64. If necessary, the content is stored in the memory card 10 or the flash ROM 23.

If the user of the PDA 1 wants to preserve the content purchased this time in the server 3, the user enters a command to preserve the content by carrying out a predetermined operation on the keyboard 12, the jog dial 13 or the touch pad 11a of the display unit 11.

Then, at the next step S4, by execution of the content purchase program 61, the PDA 1 forms a judgment as to whether or not the content purchased this time needs to be preserved in the server 3, that is, whether or not the user has entered a request for a preservation of the purchased content. If the result of the judgment shows that the content purchased this time does not need to be preserved in the server 3, the processing is ended without executing subsequent steps.

If the result of the judgment formed at the step S4 shows that the content purchased this time needs to be preserved in the server 3, on the other hand, the flow of the processing goes on to a step S5 at which, by execution of the content purchase program 61, the user's request for a preservation of the purchased content is accepted, and the communication unit 34 transmits the request to the server 3 through the Internet 2 under control of the data communication program 64.

It is to be noted that the request for a preservation of the purchased content is actually a request for an issuance of a preservation ID and, is not by all means a request for a transmission of the purchased content from the PDA 1 to the server 3 to preserve the content in the server 3.

At a step S15, by execution of the content distribution program 101, the server 3 forms a judgment as to whether or not the server 3 has received the request for a preservation of the purchased content from the PDA 1. If the result of the judgment indicates that the server 3 did not receive the request for a preservation of the purchased content from the PDA 1, the processing is ended without executing subsequent steps.

If the result of the judgment formed at the step S15 indicates that the server 3 has received the request for a preservation of the purchased content from the PDA 1, on the other hand, the flow of the processing goes on to a step S16 at which the communication unit 86 receives the request for a preservation of the purchased content from the PDA 1 through the Internet 2, and passes on the request to the content distribution program 101 under control of the input/output management program 104. Then, the preservation-ID issuance program 102 is activated.

By execution of the preservation-ID issuance program 102, a preservation ID is generated on the basis of the user ID authenticated in the processing carried out at the steps S11 and S12 and on the basis of the content ID of the content transmitted to the PDA 1 in the processing carried out at the step S14. Then, the communication unit 86 transmits (delivers) the preservation ID to the PDA 1 through the Internet 2 under control of the input/output management program 104.

Typically, a preservation ID is a hash value obtained by extracting data with a proper length from a result of applying a hash function to a user ID and a content ID. A hash value used as a preservation ID is a value obtained as a result of applying a hash function to data, which is a user ID and a content ID in this case. A hash function is a one-directional function of mapping data generally having a variable length onto a value having a fixed length. A hash function has a property that makes collisions among hash values difficult to occur.

At a step S17, by execution of the preservation-ID issuance program 102, the preservation ID issued in the processing carried out at the step S16 is stored in the preservation-ID database 5, being associated with the content ID as shown in FIG. 7.

At a step S6, the communication unit 34 employed in the PDA 1 receives the preservation ID from the server 3 through the Internet 2 under control of the data communication program 64. By execution of the content purchase program 61, the preservation ID is then stored in the memory card 10 or the flash memory 23.

As described above, the user of the PDA 1 is allowed to preserve a purchased content in the server 3 so that it is not necessary to store a purchased content in the memory card 10 or the flash memory 23.

Thus, by merely storing a preservation ID issued by the server 3 in response to a request for a preservation of a purchased content in the server 3, the PDA 1 is capable of downloading the purchased content from the server 3 if necessary at any time.

As described above, when a content is purchased, processing is carried out to form a judgment as to whether or not the purchased content needs to be preserved in the server 3. It is to be noted, however, that the present invention is not limited to this scheme. For example, a request for a preservation of a purchased content can be made when such a preservation becomes necessary at a later time after the purchase of the content. That is to say, a purchased content can be preserved in the server 3 at any time.

Figure 10:
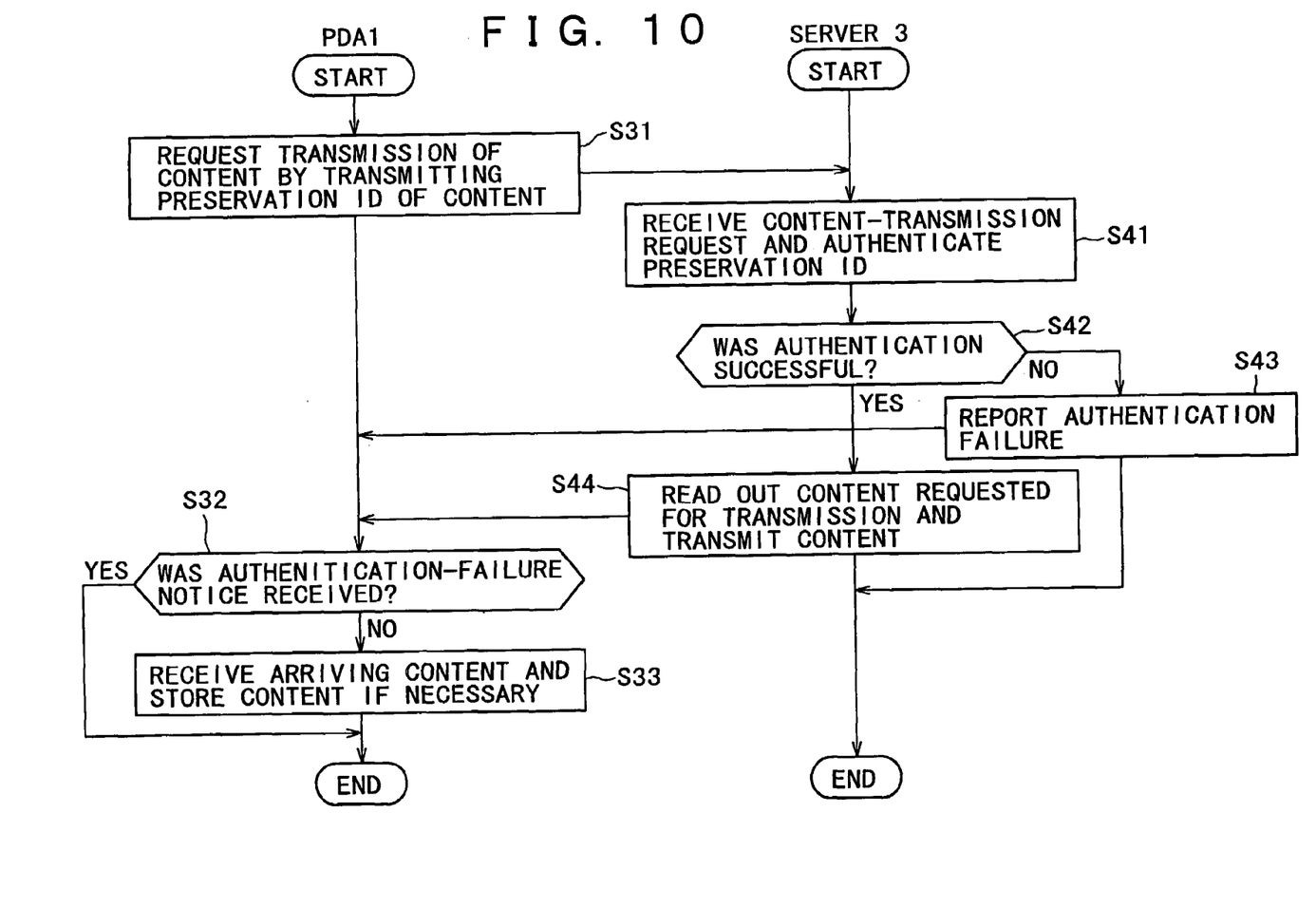

By referring to a flowchart shown in FIG. 10, the following description explains a process carried out by the PDA 1 to download a purchased content preserved in the server 3.

First of all, when the user of the PDA 1 wants to download a purchased content preserved in the server 3 under management executed by the server 3 at a request made earlier by the user to preserve the content in the server 3, the user activates the content exchange program 62 by operating the keyboard 12, the jog dial 13 or the touch pad 11a of the display unit 11. In this way, the CPU 21 employed in the PDA 1 executes the content exchange program 62 stored in the EDO DRAM 24 or the flash ROM 23. By execution of the content exchange program 62, the user selects a preservation ID among those stored in the memory card 10 or the flash ROM 23 and carries out an operation to make a request for a transmission of a purchased content identified by the preservation ID from the server 3.

At a step S31, by execution of the content exchange program 62, from the user, the PDA 1 receives a request for a transmission of a purchased content associated with the preservation ID from the server 3. The communication unit 34 transmits a signal representing the request for a transmission of a purchased content associated with the preservation ID to the server 3 by way of the Internet 2 under control of the data communication program 64.

At a step S41, in the server 3, the communication unit 86 receives the request for a transmission of a purchased content associated with the preservation ID from the PDA 1 through the Internet 2, and passes on the request to the CPU 81 under control of the input/output management program 104. The CPU 81 then executes the content distribution program 101 to handle the request for a transmission of a purchased content associated with the preservation ID. As part of the execution of the content distribution program 101, the authentication program 103 is activated.

The authentication program 103 is then executed to determine whether or not the preservation ID included in the request for a transmission of a purchased content associated with the preservation ID is valid. A result of the authentication is then supplied to the content distribution program 101.

At the next step S42, by execution of the content distribution program 101, the CPU 81 forms a judgment as to whether or not the authentication of the preservation ID was successful on the basis of the authentication result received from the authentication program 103. If the authentication of the preservation ID was unsuccessful due to, for example, the fact that the preservation ID has been falsified, the flow of the processing goes on to a step S43 at which the communication unit 86 transmits a message indicating the unsuccessful authentication of the preservation ID to the PDA 1 by way of the Internet 2 under control of the input/output management program 104. The processing is then ended without executing subsequent steps.

If the result of the judgment formed at the step S42 indicates a successful authentication of the preservation ID, on the other hand, the flow of the processing goes on to a step S44 at which, by execution of the content distribution program 1001, the CPU 81 reads out a content ID associated with the preservation ID from the preservation-ID database 5 and, then, reads out a content, which is identified by the content ID read out from the preservation-ID database 5, from the content database 4. Subsequently, the communication unit 86 transmits the content to the PDA 1 by way of the Internet 2 under control of the input/output management program 104.

At a step S32, by execution of the content exchange program 62, the PDA 1 forms a judgment as to whether or not a message received from the server 3 indicates an unsuccessful authentication of the preservation ID. If the result of the judgment shows that the message received from the server 3 indicates an unsuccessful authentication of the preservation ID, the processing is ended without executing subsequent steps.

If the result of the judgment formed at the step S32 shows that no message was received from the server 3 to indicate an unsuccessful authentication of the preservation ID, on the other hand, the flow of the processing goes on to a step S33 at which the communication unit 34 receives the content from the server 3 through the Internet 2, and passes on the content to the content exchange program 62 under control of the data communication program 64. If necessary, the content is stored in the memory card 10 or the flash ROM 23.

As described above, the user of the PDA 1 is capable of downloading a purchased content associated with a preservation ID issued by the server 3 when necessary. Thus, it is not necessary to store a purchased content in the memory card 10 or the flash ROM 23 in advance.

Thus, the user can purchase a content without worrying about the storage capacity of the memory employed in the PDA 1 owned by the user.

In addition, by using a PDA 1, a content can be purchased and preservation of the purchased content can be requested as described above. However, the present invention is not limited to the use of a PDA 1. For example, a wide range of other information-processing apparatus connectable to a digital portable telephone, a portable personal computer and the server 3 through the network such as the Internet 2 can also be applied.

The series of processes described above can be carried out by using hardware or by execution of software. If the series of processes is carried out by execution of software, programs composing the software are installed in a computer from program storage media. The computer can be a computer including embedded special-purpose hardware or a computer capable of carrying out a variety of functions by execution of a variety of programs installed therein. An example of the latter computer is a general-purpose personal computer.

The program storage media for storing programs to be installed into a storage medium employed in a computer is so-called package media. Examples of the package media are the magnetic disk 51 or 91 including a flexible disk, the optical disk 52 or 92 including a CD-ROM (Compact Disc Read-Only Memory) and a DVD (Digital Versatile Disc), the magneto-optical disk 53 or 93 or an MD (Mini-Disc, trademark) and the memory card 10 or the semiconductor memory 94 as shown in FIG. 3 or 5. The installed programs are then loaded from the storage medium into a memory such as a RAM employed in the computer in a state of being executable by the computer. The storage medium for installing programs is embedded in the hard disk drive 87. Instead of installing programs into the hard disk drive 87 as described above, the programs can be stored in advance in the flash ROM 23. The hard disk drive 87 and the flash ROM 23 are each a storage medium that can be used for storing programs temporarily or permanently. As an alternative, the programs can be installed into the storage medium employed in the computer not from the package media but, if necessary, from a remote source by way of communication media and an interface employed in the computer. The communication media includes a wire communication medium such as the Internet 2 and a radio communication medium such as the digital satellite broadcasting. The Internet 2 includes a public line network and a local area network. On the other hand, the interface employed in the computer is the communication unit 34 or 86, which is typically implemented by a router or a modem.

It is to be noted that in this specification, steps prescribing a program stored in a recording medium can of course be pieces of processing, which are carried out in a prescribed order along the time series, but do not have to be executed sequentially. That is to say, the steps can be pieces of processing, which are carried out concurrently or individually.

In addition, the word 'system' used in this specification means the whole system including a plurality of apparatuses.

INDUSTRIAL APPLICABILITY

In accordance with the present invention, the user can preserve a purchased content in a server. Thus, the user can purchase a content without worrying about the storage capacity of a memory employed in an apparatus used by the user. In addition, the server is capable of managing contents purchased by users with ease.

The invention claimed is:

1. An information-processing system comprising an information management apparatus for recording as well as managing a plurality of contents and a user device for acquiring said plurality of contents, said information management apparatus comprising:
    a first database for recording said plurality of contents;
    transmission means for receiving a request for a content of said plurality of contents identified by a content ID from the user device identified by a user ID, extracting the content from the database and transmitting the content extracted to the user device requesting the content;
    issuance means for generating a download ID based on the user ID and the content ID and issuing the download ID to the user device requesting the content; and
    a second database for recording the download ID issued by the issuance means by associating the download ID with the content ID requested by the user device by the communication means, whereas said information-processing apparatus includes
first acquirement means for requesting said information management apparatus to transmit said content and acquiring said content transmitted by said information management apparatus as requested by said first acquirement means;
second acquirement means for issuing a request to said information management apparatus to preserve said content acquired by said first acquirement means and acquiring the download ID transmitted by said information management apparatus in response to said request; and
a memory for storing said download ID acquired by said second acquirement means.

2. An information-processing apparatus comprising:
first database for recording a plurality of contents;
communication means for receiving a request for a content identified by a content ID from a user device identified by a user ID, extracting content from the first database and transmitting the content extracted to the user device requesting the content;
issuance means for generating a download ID based on the user ID and the content ID and issuing the download ID to the user device requesting the content; and
second database for recording the download ID issued by the issuance means by associating the download ID with the content ID requested by the user device through the communication means.

3. An information-processing apparatus according to claim 2, wherein when a request for a transmission of a predetermined content associated with the download ID is received from said user device, said communication means reads out the content ID associated with the download ID from said second database, reads out said content identified by the content ID from said first database and transmits said content to said user device.

4. An information-processing apparatus according to claim 2, wherein said issuance means issues the download ID when a request to preserve a content is received from said user device.

5. An information-processing method, comprising:
controlling an operation to record a plurality of contents in a first database;
receiving a request for a content identified by a content ID from a user device identified by a user ID, extracting content from the first database and transmitting the content extracted to the user device requesting the content;
generating a download ID based on the user ID and the content ID and issuing the download ID to the user device requesting the content; and
controlling an operation to record the download ID generated by associating the download ID with the content ID requested by the user device through a communication medium.

6. A computer readable storage device, including computer program instructions that cause a computer to implement a method of managing a plurality of contents, the method comprising the steps of:
controlling an operation to record a plurality of contents in a first database;
a communication processing step of receiving a request for a content identified by a content ID from a user device identified by a user ID, extracting content from the first database and transmitting the content extracted to the user device requesting the content;
an issuance processing step of generating a download ID based on the user ID and the content ID and issuing the download ID to the user device requesting the content; and
a second recording control processing step of controlling an operation to record said download ID generated by associating the download ID with the content ID requested by the user device through a communication medium.

7. A user device identified by user ID connected to a contents server, comprising:
communication means for requesting the contents server to transmit a content identified by a content ID and receiving a download ID generated by the contents server based on the user ID and content ID;
storage means for storing the download ID received by the communication means; and,
download requesting means for requesting the content for download by the download ID stored in the storage means.

8. A user device according to claim 7, further comprising:
second communication means for requesting said contents server to transmit a content identified by a content ID stored in said storage means and acquiring said content transmitted by said contents server as requested by the second communication means.

9. An information-processing method characterized in that said information-processing method comprises:
requesting a contents server to transmit a content identified by a content ID and receiving a download ID generated by the contents server based on the user ID and content ID;
storing the download ID; and,
requesting the content for download by communicating the stored download ID.

10. A computer readable storage device, including computer program instructions that cause a computer to implement a method of managing a plurality of contents, the method comprising the steps of:
a communication processing step of requesting a contents server to transmit a content identified by a content ID and receiving a download ID generated by the contents server based on the user ID and content ID;
a storage control processing step of controlling an operation to store the download ID; and,
a download requesting step for requesting the content for download by communicating the stored download ID.

* * * * *